(12) United States Patent
Mano et al.

(10) Patent No.: US 6,883,600 B2
(45) Date of Patent: Apr. 26, 2005

(54) HEAT EXCHANGER WITH DUAL HEAT-EXCHANGING PORTIONS

(75) Inventors: Takamitsu Mano, Kariya (JP); Tatsuo Ozaki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/438,718

(22) Filed: May 15, 2003

(65) Prior Publication Data

US 2003/0213587 A1 Nov. 20, 2003

(30) Foreign Application Priority Data

May 16, 2002 (JP) ........................................ 2002-141589
Oct. 30, 2002 (JP) ........................................ 2002-315674

(51) Int. Cl.[7] .............................. F28F 9/22; F28D 7/16
(52) U.S. Cl. ...................................... 165/174; 165/140
(58) Field of Search ................................ 165/140, 174, 165/173

(56) References Cited

U.S. PATENT DOCUMENTS

| | | | | | |
|---|---|---|---|---|---|
| 2,037,845 | A | * | 4/1936 | Young | 165/144 |
| 4,947,931 | A | * | 8/1990 | Vitacco | 165/140 |
| 5,097,900 | A | * | 3/1992 | Yamaguchi | 165/174 |
| 5,233,756 | A | * | 8/1993 | Le Gauyer | 29/890.043 |
| 5,348,083 | A | * | 9/1994 | Hosoya et al. | 165/174 |
| 5,586,600 | A | * | 12/1996 | Cribari | 165/173 |
| 5,782,295 | A | * | 7/1998 | Kato et al. | 165/174 |
| 6,308,410 | B1 | * | 10/2001 | Sabathie | 165/174 |
| 6,394,176 | B1 | * | 5/2002 | Marsais | 165/140 |
| 2002/0040776 | A1 | * | 4/2002 | Kokubunji et al. | 165/140 |
| 2003/0209344 | A1 | * | 11/2003 | Fang et al. | 165/140 |

FOREIGN PATENT DOCUMENTS

| | | |
|---|---|---|
| EP | 1003005 A1 * | 5/2000 |
| JP | 5-149689 | 6/1993 |
| JP | 10-213382 | 8/1998 |
| JP | 2000-18880 | 1/2000 |

* cited by examiner

*Primary Examiner*—Leonard R. Leo
(74) *Attorney, Agent, or Firm*—Harness, Dickey & Pierce, PLC

(57) ABSTRACT

Separators are prevented from being moved from a correct position before completion of soldering. After calking portions 31a, 32a, 43 are plastically deformed and the separator 31, 32 are mechanically fixed on a header tank 40 by calking, the separators 31, 32 are coupled to the header tank 40 by soldering. Thereby, as the separators 31, 32 are prevented from being moved from the correct position with respect to the header tank 40 before completion of soldering, it is possible to prevent defects in soldering where gaps are created in coupled portions.

7 Claims, 16 Drawing Sheets

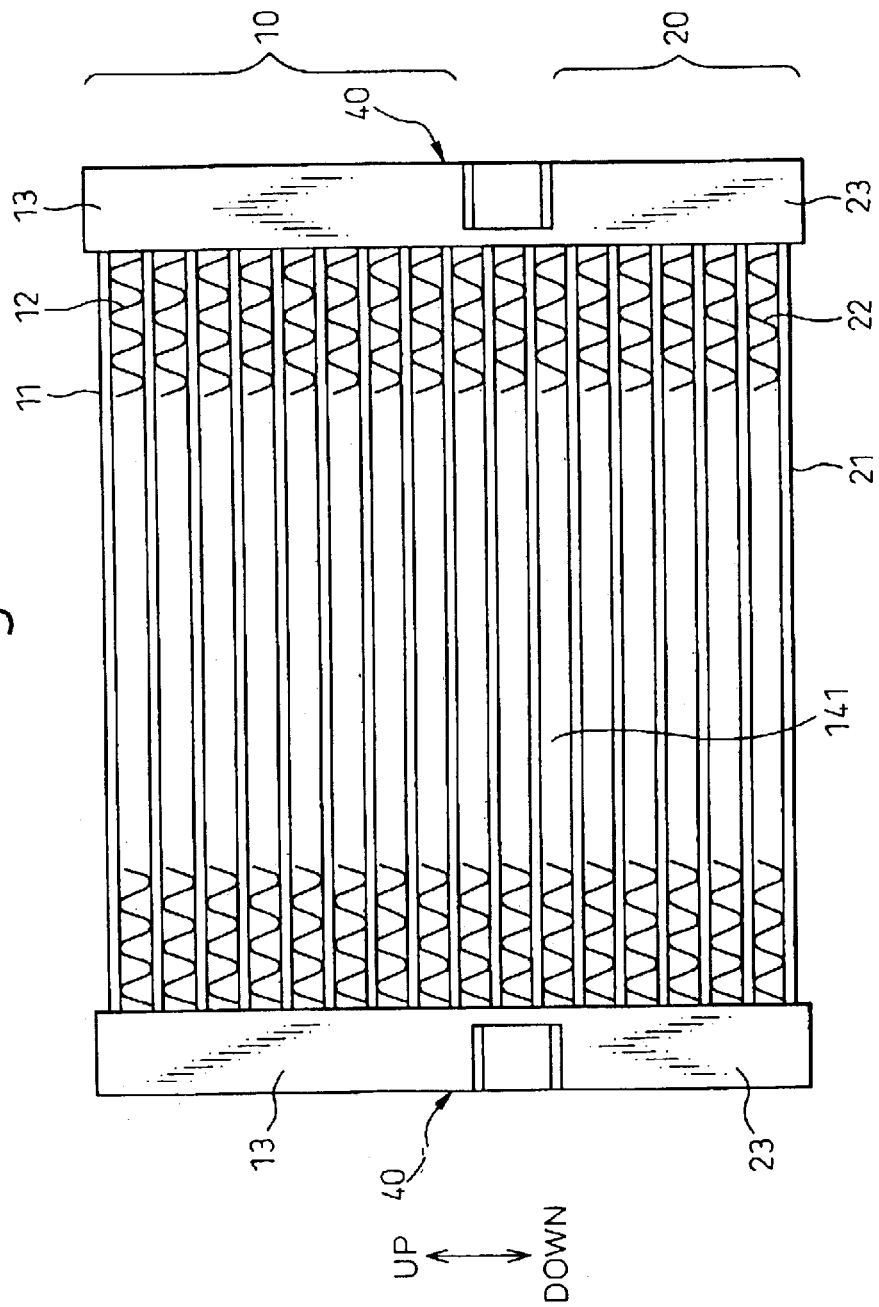

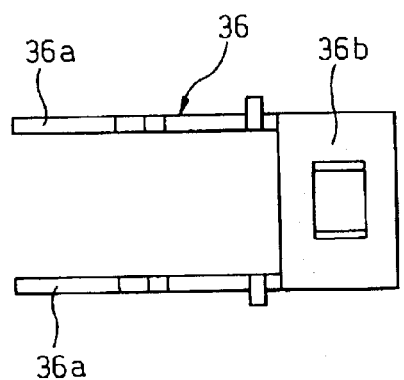
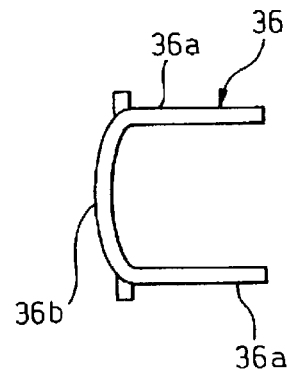
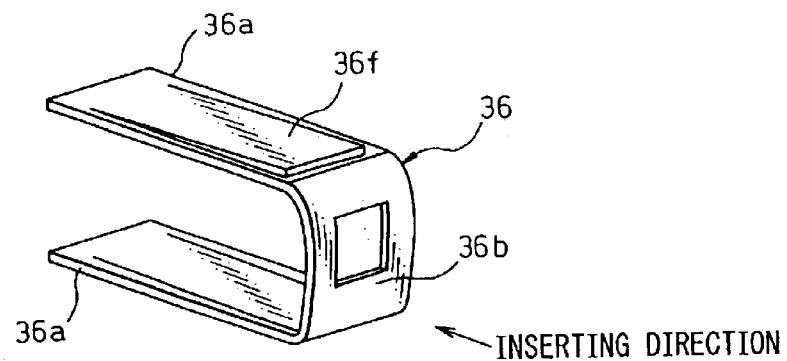

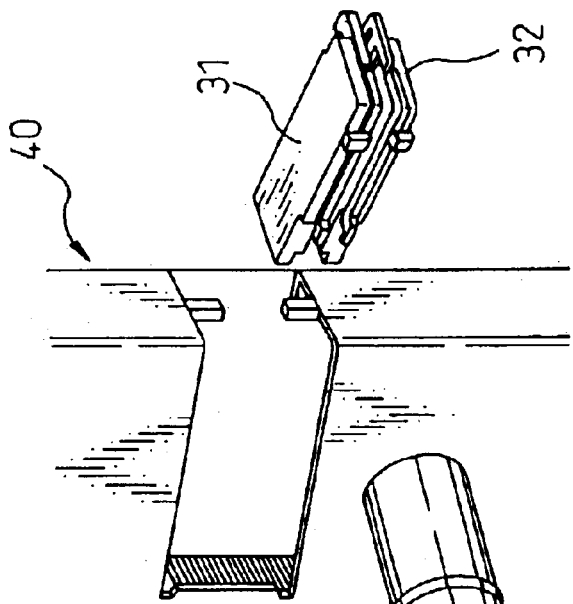
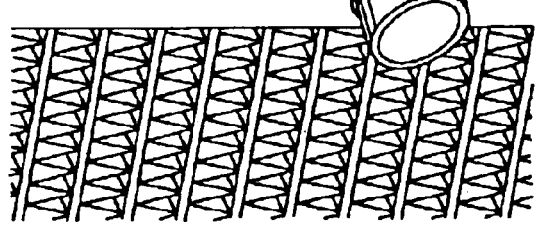
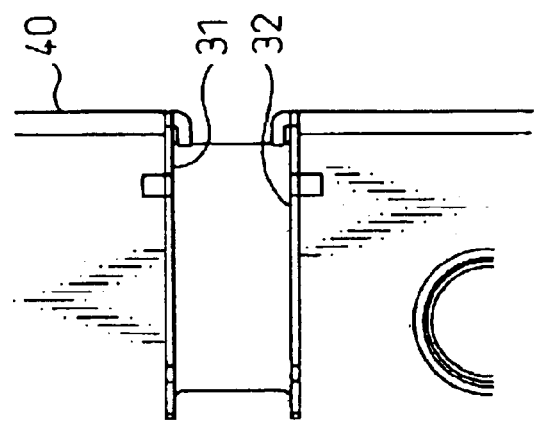
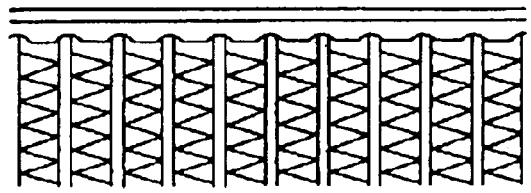
Fig.17

HEAT EXCHANGER WITH DUAL HEAT-EXCHANGING PORTIONS

BACKGROUND OF THE INVENTION

1. Field of the Invention

The present invention relates to a heat exchanger integrally composed of two heat exchangers and suitable and effective for a vehicle, such as a hybrid type vehicle, which has a driving means formed by combining an internal combustion engine and an electric motor.

2. Description of the Related Art

A hybrid type vehicle generally need two radiators, that comprise a first radiator which cools engine cooling water circulating in an engine (an internal combustion engine) and a second radiator which cools electric system cooling water circulating in an electric motor, and an electric control circuit thereof.

In this case, as the suitable temperature and pressure of the engine cooling water is different from that of the electric system cooling water, it is not effective and it deteriorates the cooling efficiency if a single radiator is used to cool both cooling water flows.

On the contrary, in the prior art, there is a proposal in which, after slits are provided on a header tank and separators are inserted in the slits, the separators are coupled to the header tank, by soldering, together with components such as tubes and fins.

In the example of the prior art described above, as shown in "A" portion of FIG. 19, as the end surface of a separator 3 is vertically attached to the inner wall of a header tank 4 and then the separator 3 is coupled to the header tank 4 by soldering, it is difficult to assure reliability in soldering for the reason described below.

When described in more detail, as the separator 3 is formed by punching out a plate material coated with a solder that is a clad material, after pressing work etc., there is very little solder on the end surface of the separator.

In this way, in order to couple the end surface of the separator to the inner wall of the header tank by soldering and as, during soldering, that is, when the solder is melted in a furnace by heating, the solder coated on the potions other than the end surface of the separator is required to flow into a small gap between the end surface of the separator 3 and the inner wall of the header tank 4, it is difficult to supply enough solder into the small gap between the end surface of the separator 3 and the inner wall of the header tank 4 during soldering and it is difficult to assure reliability in soldering.

SUMMARY OF THE INVENTION

The present invention has been developed with above-mentioned problems being taken into consideration, and the first object is to provide a novel heat exchanger different from the prior art. The second object is to prevent a separator from moving from the correct position before completion of the soldering. The third object is to assure reliability in soldering between a separator and a header tank.

To realize the above-mentioned object, according to a first aspect of the present invention, a heat exchanger comprises: a plurality of first tubes (11) through which first fluid flows; a plurality of second tubes (21) which are arranged in parallel with the first tubes (11) and through which second fluid flows; header tanks (40) which are provided on the both longitudinal ends of the both tubes (11, 21), extend in a perpendicular direction to the extending direction of the both tubes (11, 21), and communicate with the both tubes (11, 21); two separators (31, 32) which separate a space in the header tank (40) into a first space (16) communicating with the first tubes (11) and a second space (26) communicating with the second tubes (21) and, at the same time, separate the first and second spaces from each other at a desired distance; wherein on at least one of the two separators (31, 32) and the header tank (40) calking portions (31a, 32a, 43) are provided; and wherein the calking portions (31a, 32a, 43) come into contact with the other of the two separators (31, 32) or the header tank (40) and fix the two separators (31, 32) to the header tank (40).

Due to this structure, it is possible to obtain a novel heat exchanger different from the prior art and, at the same time, it is possible to prevent the separators (31, 32) from moving from the correct position with respect to the header tank (40) before completion of the soldering, so that it is possible to prevent defects in soldering where gaps are created in the coupled portions.

According to a second aspect of the present invention, a heat exchanger comprises: a plurality of first tubes (11) through which first fluid flows; a plurality of second tubes (21) which are arranged in parallel with the first tubes (11) and through which second fluid flows; header tanks (40) which are provided on the both longitudinal ends of the both tubes (11, 21), extend in a perpendicular direction to the extending direction of the both tubes (11, 21), and communicate with the both tubes (11, 21); and a separator (36) formed in a substantial U-shape and having two separating portions (36a), which separate a space in the header tank (40) into a first space (16) communicating with the first tubes (11) and a second space (26) communicating with the second tubes (21) and separate the first and second spaces from each other at a desired distance, and a connecting portion (36b) connecting the separating portions (36a); wherein on at least one of the two separating portions (36a) and the header tank (40), calking portions (36d) are provided; and wherein the calking portions (36d) come into contact with the other of the two separating portions (36a) or the header tank (40) and fix the two separating portions (36a) to the header tank (40).

Due to this structure, it is possible to obtain a novel heat exchanger different from the prior art and, at the same time, it is possible to prevent the separator (36) from moving from the correct position with respect to the header tank (40) before completion of the soldering, so that it is possible to prevent defects in soldering where gaps are created in the coupled portions.

According to a third aspect of the present invention, the connecting portion (36b) bends so that the length measured along the connecting portion (36b) which connects one of the two separating portions (36a) to the other separating portion (36a) becomes larger than the distance between the two separating portions (36a).

Due to this structure, it is possible to push the separator (36) to come into contact with the header tank (40) by elastic force of the connecting portion (36b) produced, for example, by a spring characteristic in the connecting portion (36b) or by plastically deforming the connecting portion (36b) so that the bends of the connecting portion (36b) are extended.

Therefore, it is possible to prevent the separator (36) from moving from the correct position with respect to the header tank (40) without fail before completion of the soldering, because it is possible to mechanically fix the separator (36) to the header tank (40) in a firm manner.

According to a fourth aspect of the present invention, a space (34) in the header tank (40) formed by the separators (31, 32, 36) is a free space which communicates with the outside of the header tank (40).

According to a fifth aspect of the present invention, a heat exchanger comprises: a plurality of first tubes (11) through which first fluid flows; a plurality of second tubes (21) which are arranged in parallel with the first tubes (11) and through which second fluid flows; header tanks (40) which are provided on the both longitudinal ends of the both tubes (11, 21), extend in a perpendicular direction to the extending direction of the both tubes (11, 21), and communicate with the both tubes (11, 21); at least a separator (31, 32, 36) which separates a space in the header tank (40) into a first space (16) communicating with the first tubes (11) and a second space (26) communicating with the second tubes (21) and, at the same time, separates the first and second space from each other at a desired distance; and a valve (50) able to open and close, which is provided on the at least a separator (31, 32, 36) and communicates the inside of the header tank (40) with the outside thereof.

Due to this structure, it is possible to obtain a novel heat exchanger different from the prior art and, at the same time, it is possible to effectively use a space provided between the first space (16) and the second space (26).

According to a sixth aspect of the present invention, the body (51) of the valve (50) is fixed to the at least a separator (31, 32, 36) in a state in which the body (51) contacts both the first space (16) side and the second space (26) side of the separator (31, 32, 36).

Due to this structure, as the space between the first space (16) and the second space (26) is configured to be reinforced by the valve (50), it is possible to improve the buckling strength of the header tank (40), for example.

According to a seventh aspect of the present invention, a heat exchanger comprises: a plurality of first tubes (11) through which first fluid flows; a plurality of second tubes (21) which are arranged in parallel with the first tubes (11) and through which second fluid flows; header tanks (40) which are provided on the both longitudinal ends of the both tubes (11, 21), extend in a perpendicular direction to the extending direction of the both tubes (11, 21), and communicate with the both tubes (11, 21), a first and a second separators (31, 32) which separate a space in the header tank (40) into a first space (16) communicating with the first tubes (11) and a second space (26) communicating with the second tubes (21) and, at the same time, separate the first and second spaces from each other at a desired distance; wherein each of the first separator (31) and the second separator (32) has a soldered surface (36) formed by folding the outer circumferential portion of a plate member coated with a solder and coupled to the wall surface of the header tank (40) by soldering; wherein an aperture (33) into which the two separators (31, 32) are inserted is provided on the header tank (40); and wherein the dimension (h) of the portion of the aperture (33) in parallel with the longitudinal side of the header tank (40) is larger than the sum of the dimension (t1) of the portion of the soldered surface (36) of the first separator (31) in parallel with the longitudinal side of the header tank (40) and the dimension (t2) of the portion of the soldered surface (36) of the second separator (32) in parallel with the longitudinal side of the header tank (40).

Due to this structure, as it is possible to obtain enough solder material on the soldered surfaces of the separators (31, 32), it is possible to assure reliability in soldering.

On the other hand, each of the separators (31, 32) has a soldered surface (36) parallel to the wall surface of the header tank (40), so that it is not possible to assemble the separators (31, 32) to the header tank (40) if it has the same structure as the prior art example (refer to FIG. 19) described above in which slits are provided on the header tank (40) and the separators (31, 32) are inserted into the slits.

This means that, in the present invention after the separators (31, 32) are inserted into the header tank (40) from the transverse direction of the longitudinal direction of the header tank (40), the separators (31, 32) must be moved in substantially parallel direction of the longitudinal direction of the header tank (40), so that the soldered surfaces (36) come into contact with the wall surfaces of the header tank (40) and, therefore, if the dimension (h) of the aperture (33) is made equal to the thickness of the separators as in the prior art example described above (refer to FIG. 19), it is not possible to move the separators (31, 32) in the direction substantially parallel to the longitudinal direction of the header tank (40) after the separators (31, 32) are inserted into the header tank (40).

On the contrary, in the present invention, as the dimension (h) of the portion of the aperture (33) in parallel with the longitudinal side of the header tank (40) is made larger than the sum of the dimension (t1) of the portion of the soldered surface (36) of the first separator (31) in parallel with the longitudinal side of the header tank (40) and the dimension (t2) of the portion of the soldered surface (36) of the second separator (32) in parallel with the longitudinal side of the header tank (40), it is possible to move the separators (31, 32) in the direction substantially parallel with the longitudinal direction of the header tank (40) after the separators (31, 32) are inserted into the header tank (40) and thus it is possible to easily assemble the separators (31, 32) to the header tank (40).

Accordingly, in the present invention it is possible to easily assemble the separators (31, 32) to the header tank (40) and to assure reliability in soldering of the separators (31, 32) to the header tank (40).

According to an eighth aspect of the present invention, in a heat exchanger the dimension (h) of the portion of the aperture (33) in parallel with the longitudinal side of the header tank (40) is not less than 1.2 times of the sum of the dimension (t1) of the portion of the soldered surface (36) of the first separator (31) in parallel with the longitudinal side of the header tank (40) and the dimension (t2) of the portion of the soldered surface (36) of the second separator (32) in parallel with the longitudinal side of the header tank (40).

In a ninth aspect of the present invention, the dimension (h) of the portion of the aperture (33) in parallel with the longitudinal side of the header tank (40) is larger than 2 times of the interval dimension (Pt) between the tubes that are either of the tubes (11, 21).

According to a tenth aspect of the present invention, the interval between the first tubes (11) is equal to that between the second tubes (21).

According to an eleventh aspect of the present invention, the aperture (33) is formed by cutting off a part of the outer circumference of the header tank (40).

Due to this structure, it is possible to prevent the buckling strength of the header tank (40) from being considerably deteriorated.

According to a twelfth aspect of the present invention, the header tank (40) is configured to have a core plate (41) coupled with both tubes (11, 21) and a tank plate (42) coupled to the core plate (41) to compose a cylindrical body in combination with a core plate (41), and the aperture (33) is formed by cutting off a part of the tank plate (42).

Due to this structure, it is possible to prevent the buckling strength of the header tank (40) from being considerably deteriorated.

In the above cases, the parenthesized reference symbols and numbers for each component described above exemplarily show the corresponding relation with concrete components described in embodiments described later.

The present invention may be more fully understood from the description of the preferred embodiments of the invention set forth below, together with the accompanying drawings.

BRIEF DESCRIPTION OF THE DRAWINGS

In the drawings:

FIG. 1 is a front view of a heat exchanger according to an embodiment of the present invention.

FIG. 8A is an exemplary side view of a separator according to a sixth embodiment of the present invention.

FIG. 8B is an exemplary front view of the separator in FIG. 8A.

FIG. 9 is an exemplary perspective drawing of a separator according to a seventh embodiment of the present invention.

FIG. 17 is an exemplary drawing of separators according to the tenth embodiment of the present invention showing an assembling method thereof.

Figure 2A:
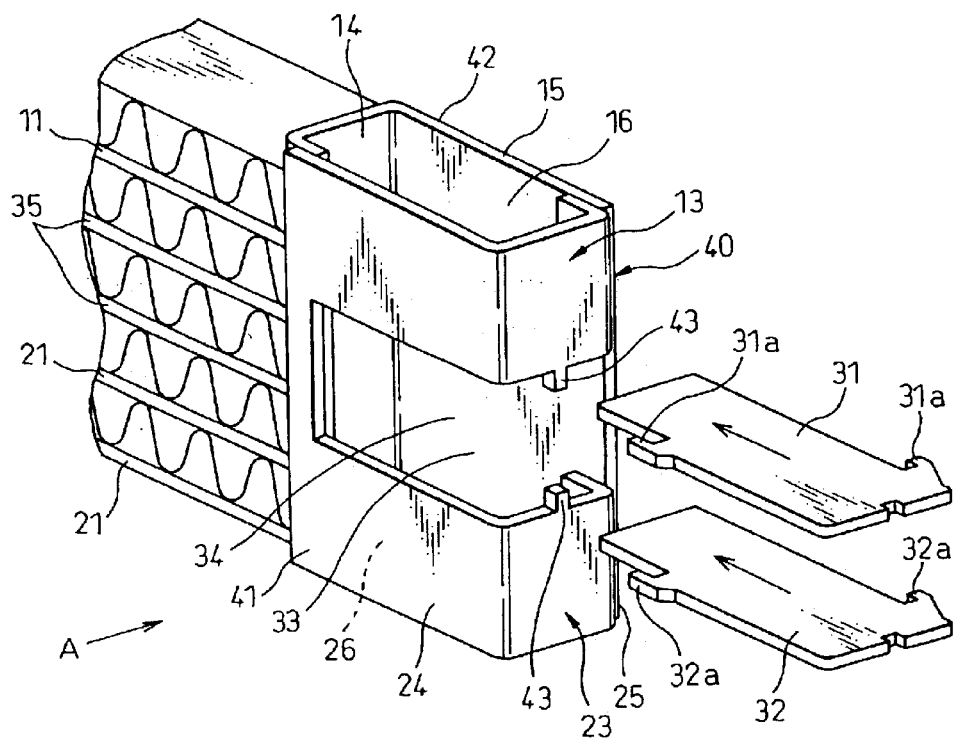
FIG. 2A is an exemplary drawing of a header tank according to a first embodiment of the present invention.

DESCRIPTION OF THE PREFERRED EMBODIMENTS (First Embodiment)

The present embodiment is one where a heat exchanger according to the present invention is adapted to a radiator for a hybrid type vehicle which has a driving means built by combining an internal combustion engine and an electric motor. FIG. 1 is a front view of a radiator (a heat exchanger) according to the present invention.

In the FIG. 1, a first radiator 10 is a first heat exchanging portion which cools first cooling water that cools an engine by heat exchange between the first cooling water and the air, and a second radiator 20 is a second heat exchanging portion which cools second cooling water that circulates in an electric motor and an electric control circuit, such as an inverter circuit, that controls the electric motor, and the second heat exchanging portion cools an electric motor and an electric control circuit by heat exchange between the second cooling water and the air.

The first radiator 10 comprises a plurality of first tubes 11 through which first cooling water flows, wave-shaped first fins 12 which are attached on the outer surface of the first tubes 11 and increase a heat transferring area to air, first header tanks 13 which are positioned on the both end sides of the longitudinal direction of the first tubes 11, extend in a perpendicular direction to the longitudinal direction of the first tubes 11, and communicate with the each first tube 11, etc.

The second radiator 20 also has a structure similar to that of the first radiator 10 and comprises a plurality of second tubes 21 which are arranged in parallel with the first tubes 11 and through which second cooling water flows, wave-shaped second fins 22 which are attached on the outer surface of the second tubes 21 and increase the heat transferring area to air, second header tanks 23 which are positioned on the both end sides of the longitudinal direction of the second tubes 21, extend in the perpendicular direction to the longitudinal direction of the second tubes 21, and communicate with the each second tube 21, and the like.

Figure 2B:
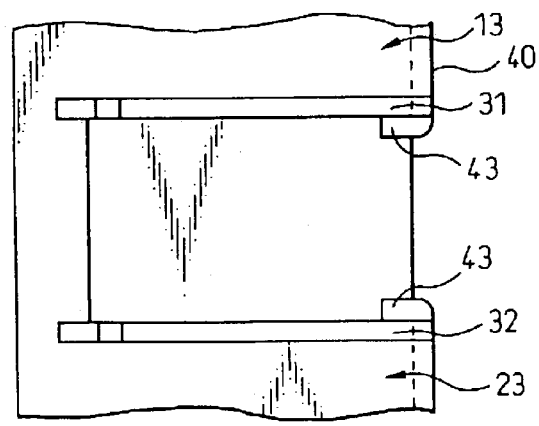
FIG. 2B is a sectional view when viewed from A direction.

The first header tank 13, as shown in FIG. 2, comprises a first core plate section 14 to which the first tubes 11 are coupled, a first header tank body portion 15 which is coupled to the first core plate section 14 so as to form a space in the first header tank 13, and the like.

The second header tank 23, similarly to the first header tank 13, also comprises a second core plate section 24 to which the second tubes 21 are coupled, a second header tank body portion 25 which is coupled to the second core plate section 24 so as to form a cylindrical space in the second header tank 23, and the like.

In this case, the first core plate section 14 and the second core plate section 24 together with the first header tank body portion 15 and the second header tank body portion 25 are integrally formed so that the sectional shapes thereof become an L (or J) shape when viewed from the longitudinal direction of the both tanks 13 and 23, respectively, by press-molding a sheet of a plate into a desired shape, and then the first header tank 13 and the second header tank 23 are integrally combined into a unit.

The integrated tank is called a header tank 40, the portion integrated with the first core plate section 14 and the second core plate section 24 is generally called a core plate 41, and the portion integrated with the first header tank body portion 15 and the second header tank body portion 25 is generally called a header tank body portion 42, hereinafter.

In addition, the separators 31, 32 are the separating plates that separate a space in the integrated header tank 40 into a first space 16 communicating with the first tubes 11 and a second space 26 communicating with the second tubes 21.

And at the same time, both separators 31, 32 are separated from each other at a predetermined distance and, on the other hand, an aperture 33 is formed between the first core plate section 14 and the second core plate section 24 by cutting off a part of the core plate 41.

Therefore, a space 34 formed by the separators 31, 32 and the header tank body portion 42 are configured to provide an open space that connects to the outside of the header tank and, at the same time, has function as a heat insulating portion that restricts heat from transferring from the first header tank 13 side to the second header tank 23 side.

In this case, tubes 35 communicating with the space 34 are dummy tubes through which cooling water cannot flow.

Figure 3:
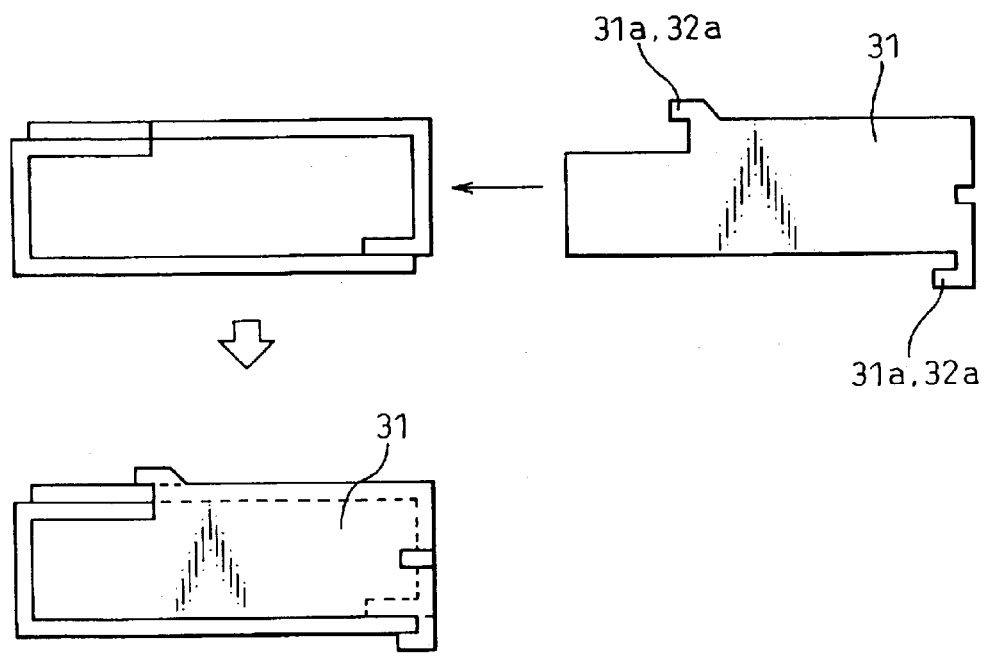
FIG. 3 is an exemplary drawing of separators and a header tank according to the first embodiment of the present invention.

The separators 31, 32 are provided with calking portions 31a, 32a, as shown in FIG. 2A and FIG. 3, which come into contact with the header tank and mechanically fix the separators 31, 32 to the header tank 40 and, on the other hand, the header tank 40 is provided with calking portions 43 which come into contact with the separators 31, 32 and mechanically fix the separators 31, 32 to the header tank 40.

The calking portions 31a, 32a, 43 are made by plastically deforming and then by press-welding parts of one of the separators 31, 32 or the header tank 40 to the other, the calking portions 31a, 32a prevent the separators 31, 32 from moving with respect to the header tank 40 from the proper position in both the parallel direction of the longitudinal direction of the tubes 11, 21, 35 and the orthogonal direction thereof and the calking portions 43 act so as to press the separators 31, 32 against the core plate 41 and prevent the separators 31, 32 from moving, with respect to the header tank 40, from the proper position in the parallel direction of the longitudinal direction of the tubes 11, 21, 35.

The tubes 11, 21, 35, the core plate 41, the header tank body portion 42, the separators 31, 32, etc. are all made of an aluminum alloy and, after assembly as shown in FIG. 1, these components are heated in a furnace and integrally fixed by soldering in a state in which the assembled condition is maintained by jigs such as wires.

In this case, the core plate 41 and the header tank body portion 42 are clad materials which are coated with solder material on the surfaces thereof, which are the outer surfaces of the header tank 40 and are coated with sacrificial and corrosive material on the inner surfaces thereof, and the separators 31, 32 are clad materials coated with solder material on both the outer and inner surfaces thereof.

Next, the functions and effects of the present embodiment described above will be described.

In the present embodiment, as the separators 31, 32 are calked and mechanically fixed to the header tank 40 by the calking portions 31a, 32a, 43, a problem such that separators 31, 32 move from the correct position with respect to the header tank 40 before completion of the soldering does not appear. Therefore, it is possible to prevent a defect in soldering such that no gap is created in the coupled portions.

As the space 34 is an open space connecting to the outside of the header tank 40, it is also possible to easily perform the calking work for the calking portions 31a, 32a, 43.

Even if defects in soldering occurs at the separators 31, 32, it is also possible to easily repair the defects in soldering by using the space 34 which is an open space.

(Second Embodiment)

Figure 4:
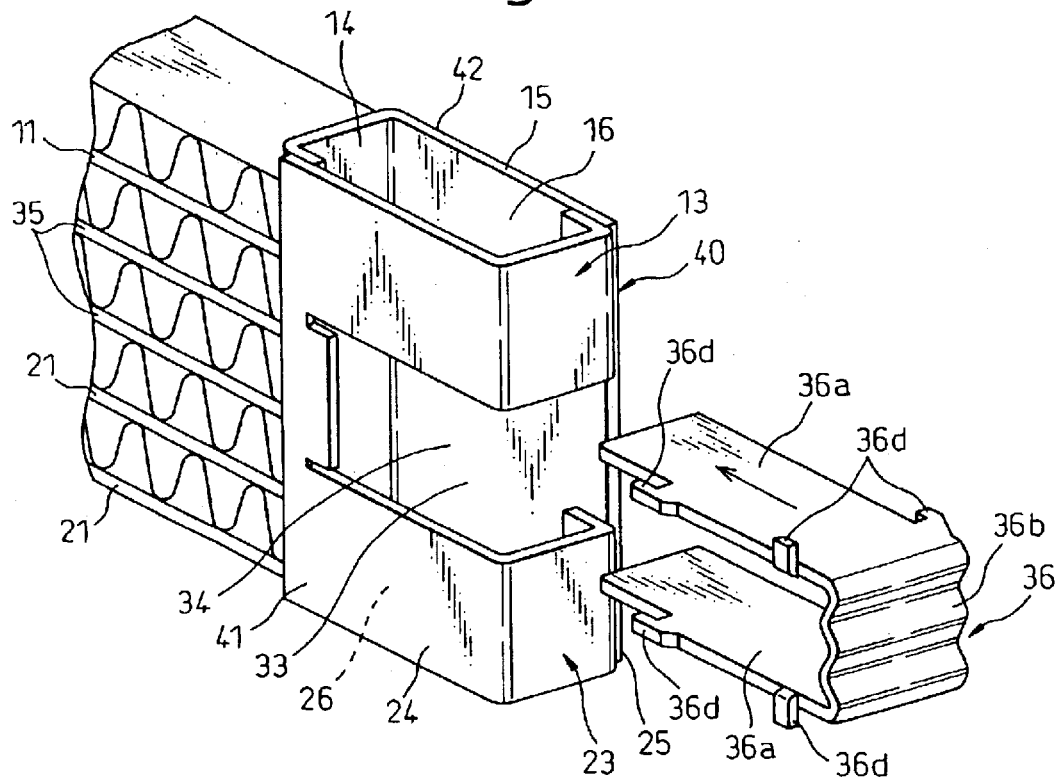
FIG. 4 is an exemplary drawing of a header tank according to a second embodiment of the present invention.

In the first embodiment the separators 31, 32 are made into a simple plate-like form, but in the present embodiment, as shown in FIG. 4, a separator 36 is formed into a substantially U shape so that it has a connecting portion 36b connecting two separating portions 36a and 36a which separate a space in the header tank 40 into a first space 16 and a second space 26. In this case, the separating portions 36a correspond to the two separators 31, 32 in the first embodiment.

In the present embodiment, the separating portions 36a of the separator 32 are provided with calking portions 36d which have the same function as the calking portions 31a, 32a, 43 according to the first embodiment.

In the present embodiment, the connecting portion 36b is bent in a wave-like shape so that the length measured along the connecting portion 36b, which connects one of the two separating portions 36a to the other separating portion 36a, becomes larger than the distance between the two separating portions 36a. Due to this structure, it is possible to push the separator 36 (especially the separating portions 36a) into contact with the header tank 40 by the elastic force, of the connecting portion 36b, which is created by the spring characteristic of the connecting portion 36b.

Due to this structure, it is possible to prevent a separator 36 from moving from the correct position with respect to the header tank 40 without fail before completion of the soldering, because it is possible to mechanically fix the separator 36 to the header tank 40 in a firm manner.

(Third Embodiment)

Figure 5:
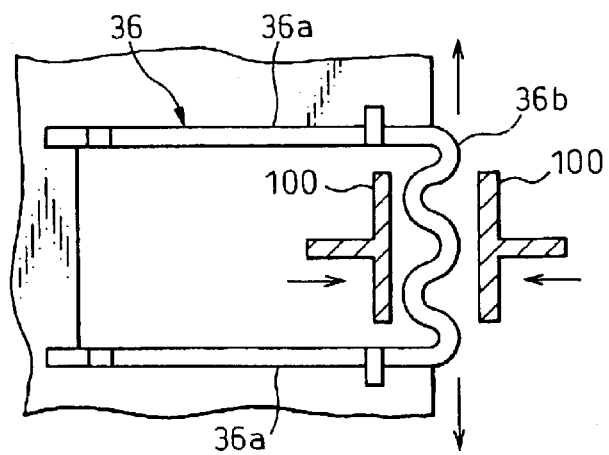
FIG. 5 is an exemplary drawing of separators according to a third embodiment of the present invention.

In the second embodiment the spring characteristic of the connecting portion 36b is applied. In the present embodiment, on the contrary and as shown in FIG. 5, after a separator 36 is attached to a header tank 40, a jig 100 is used to press and to plastically deform the connecting portions 36b so as to extend the bends of the connecting portion 36b, so that the separator 36 (especially separating portions 36a) is pressed to come into contact with the header tank 40.

(Fourth Embodiment)

Figure 6A:
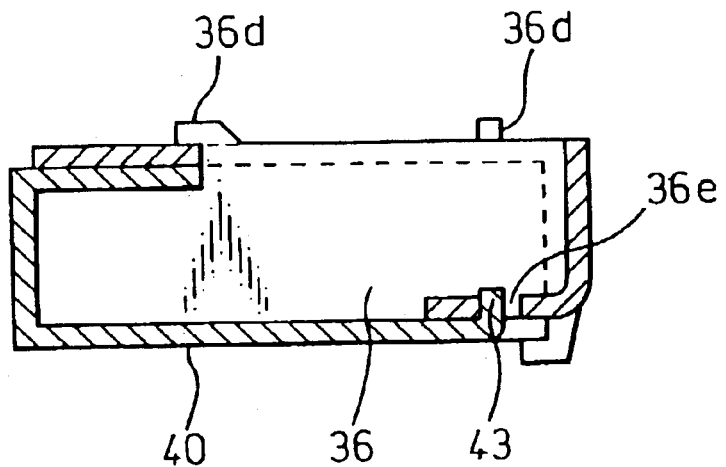
FIG. 6A is an exemplary plan drawing of a separator according to a fourth embodiment of the present invention assembled with a header tank.
Figure 6B:
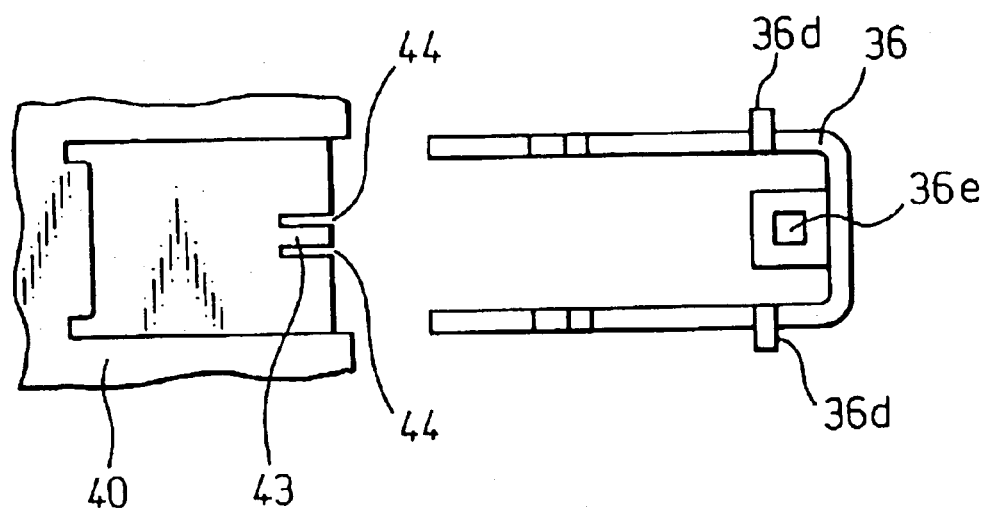
FIG. 6B is an exemplary side view of the separator and the caulking portion 43 of the header tank, separated from each other, in FIG. 6A.

The present embodiment is a variant of the second and third embodiments. In practice, as shown in FIG. 6B, slits 44 are provided on the header tank 40 and after the separator 36 is attached to the header tank 40, a calking portion 43 formed between the slits 44 as shown in FIG. 6A, is plastically deformed and inserted into a calking hole 36e provided on the separator 36, so that the separator 36 can be fixed to the header tank 40.

(Fifth Embodiment)

Figure 7A:
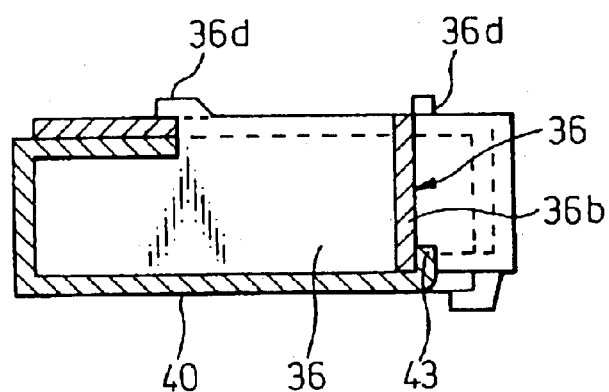
FIG. 7A is an exemplary plan drawing of a separator according to a fifth embodiment of the present invention assembled with a header tank.
Figure 7B:
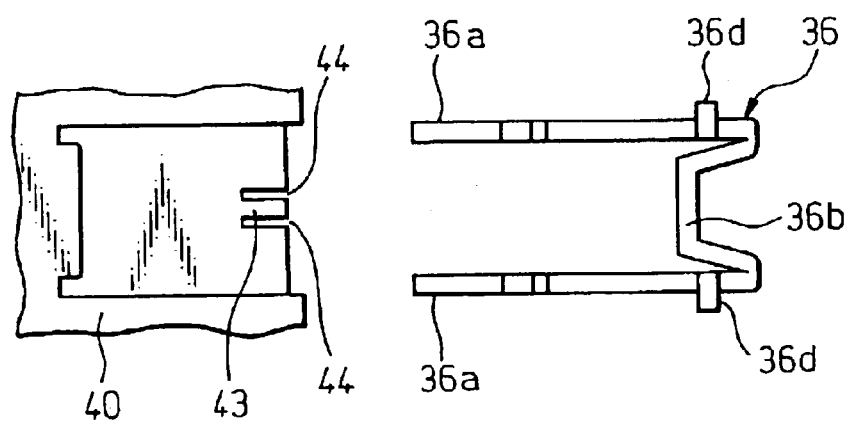
FIG. 7B is an exemplary side view of the separator and the caulking portion 43 of the header tank, separated from each other, in FIG. 7A.

The present embodiment is also a variant of the second and third embodiments. In practice, as shown in FIG. 7, after the separator 36 is attached to the header tank 40, a calking portion 43 is plastically deformed and pressed to come into contact with the connecting portion 36b of the separator 36.

(Sixth Embodiment)

In the separator 36 according to the second to fifth embodiments, the connecting portion 36b is provided on the surface substantially orthogonal to the longitudinal direction of the tubes 11, 21, 35. However, in the present embodiment, on the contrary and as shown in FIG. 8, the connecting portion 36b is provided on the surface substantially parallel with the longitudinal direction of the tubes 11, 21, 35.

Due to this structure, it is possible to prevent the bent connecting portion 36b from sticking out in the direction parallel with the longitudinal direction of the tubes 11, 21, 35, in the header tank 40.

(Seventh Embodiment)

The separating portions 36a of the separator 36 according to the second to sixth embodiments are provided in a simple flat plate shape. However, in the present embodiment, as shown in FIG. 9, separating portions 36a are provided to have inclined protrusions 36f, which are formed by press molding so as to protrude into the spaces 16 and 26 and, at the same time, the more it proceeds forward in the inserting direction of the separator 36, the smaller the protruding dimension of the protrusions 36f becomes.

Due to this structure, as the root sides and the side surfaces of the protrusions 36f of the separating portions 36a come into contact with the header tank 40, it is possible to make the contacting area between the separating portions 36a and the header tank 40 larger than that of the separators according to the first to sixth embodiments.

Therefore, as the joining force between the separator 36 and the header tank 40 can be increased and, at the same time, the protrusions 36f act as stoppers for withdrawal of the separator 36, it is possible for the separator 36 to be fixed to the header tank 40 without fail.

Further, the more it proceeds forward in the inserting direction of the separator 36, the smaller the protruding dimension of the protrusions 36f becomes and it is possible to easily assemble the separator 36 onto the header tank 40.

(Eighth Embodiment)

Figure 10A:
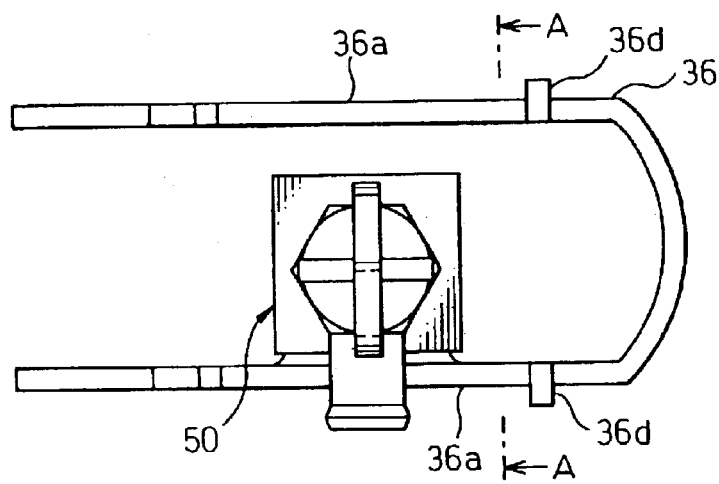
FIG. 10A is an exemplary side view of a separator according to an eighth embodiment of the present invention.
Figure 10B:
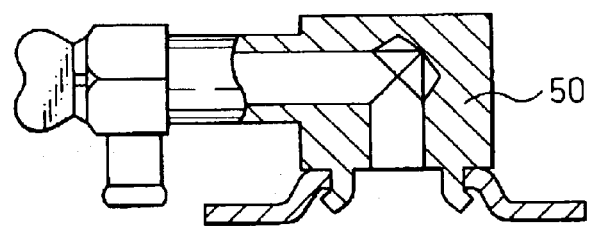
FIG. 10B is a sectional view taken along line A—A in FIG. 10A.

In the present embodiment, as shown in FIG. 10, a valve 50 which can open and close and communicates the inside of the header tank 40 with the outside thereof is provided on the separating portion 36a of the separator 36, so that it effectively uses the space 34.

In this case, the valve 50 is used for releasing air in the header tank 40 or for draining water therein, and when it is arranged on the bottom side of the first header tank 13 or the second header tank 23, it is used as a water drain port, and when it is arranged on the top side of the first header tank 13 or the second header tank 23, it is used as an air releasing port.

In addition, in FIG. 10, the valve 50 is mounted on the separator 36. However, the present embodiment is not limited to this application and, of course, the valve 50 may not only be mounted on the separators 31, 32 according to the first embodiment, but also it may be mounted on the separator having no calking portions 31a, 32a, 43, or 36d.

(Ninth Embodiment)

Figure 11:
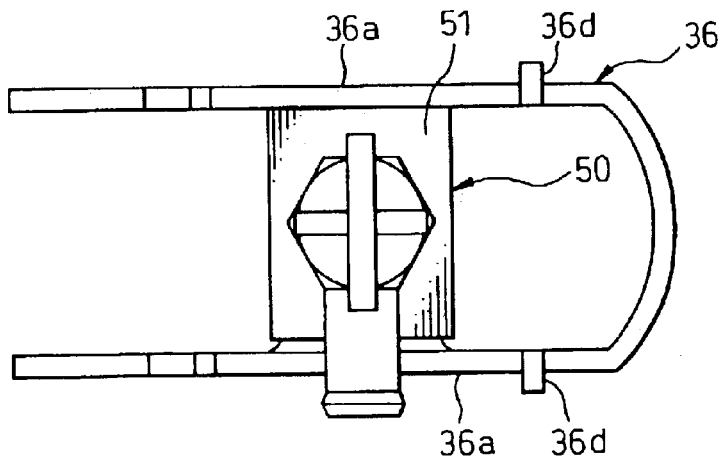
FIG. 11 is an exemplary drawing of a separator according to a ninth embodiment of the present invention.

The present embodiment is a variant of the eighth embodiment. In practice, as shown in FIG. 11, the valve 50 is mounted on the separator 36 in a state that the body 51 of the valve 50 is in contact with the both separating portions 36a.

Due to this structure, as the space 34, that is, a space between two sheets of the separating portions 36a is configured to be reinforced by the valve 50, it is possible to improve the buckling strength of the header tank (40), for example.

In addition, although in FIG. 10 the valve 50 is mounted on the separator 36, the present embodiment is not limited to this application and, of course, the valve 50 may not only be mounted on the separators 31, 32 according to the first embodiment, but also it may be mounted on the separator having no calking portions 31a, 32a, 43, or 36d.

(Tenth Embodiment)

Figure 15:
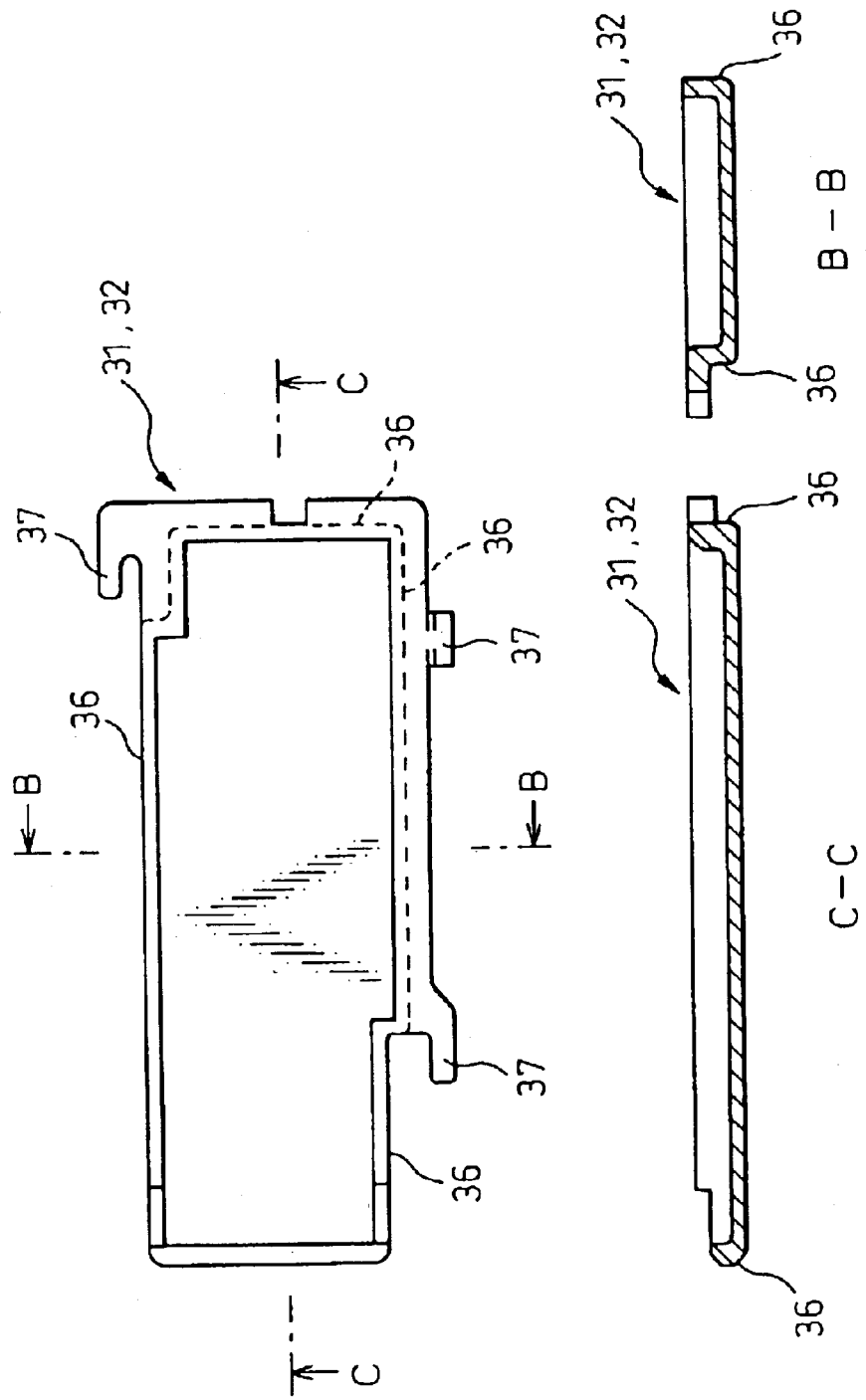
FIG. 15 is a three-dimensional drawing of the separator according to the tenth embodiment of the present invention.
Figure 16:
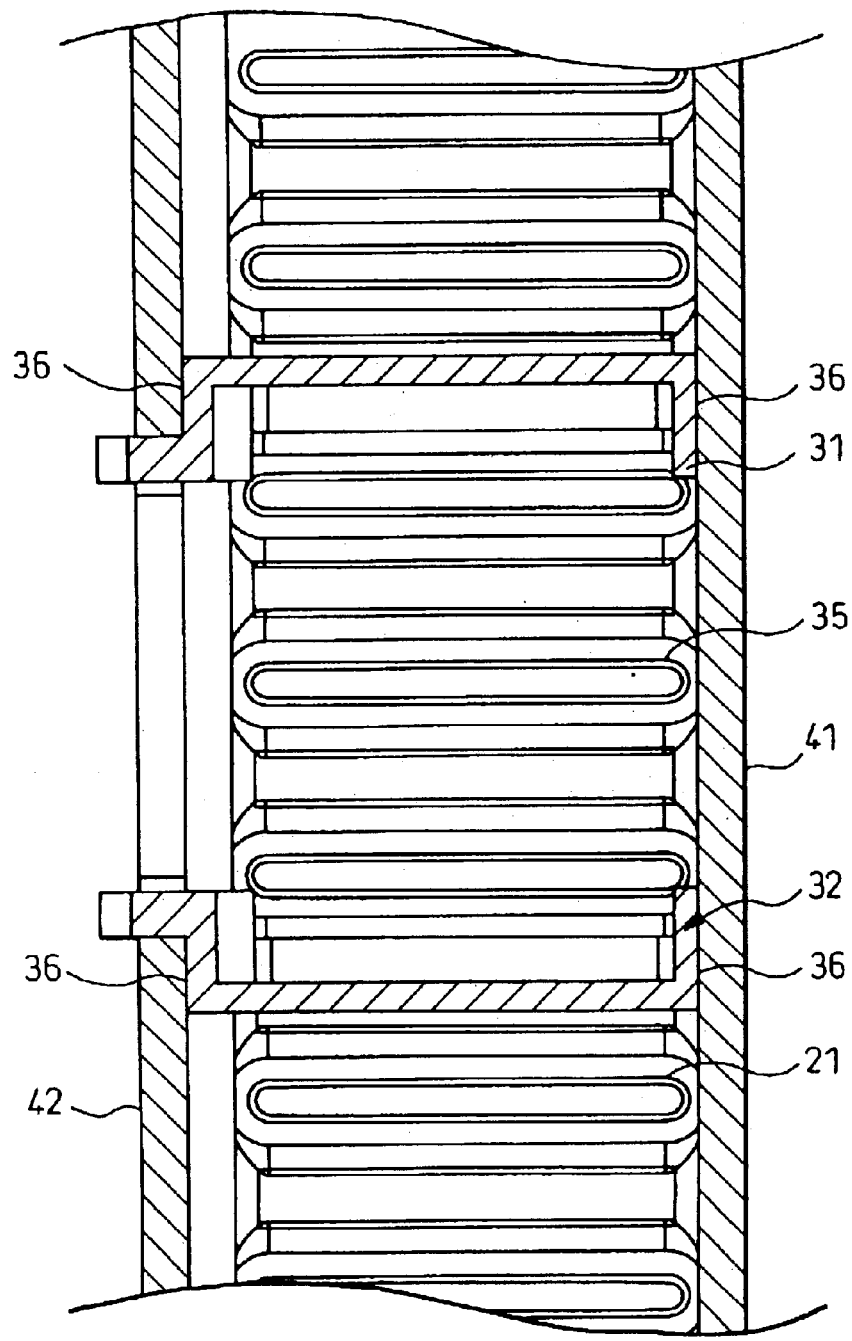
FIG. 16 is a sectional view of part in FIG. 13 viewed from front.

In the present embodiment, as shown in FIG. 15, both separators 31, 32 are provided with surfaces 36 parallel with the inner wall surfaces of the header tank 40 and produced by folding the outer circumferential portion of a clad member coated with solder material on either of two surfaces thereof by pressing the clad member and the coated surface 36 is made as a soldered surface coupled to the inner wall of the header tank 40 by soldering. FIG. 16 shows a state in which the soldered surfaces 36 come into contact with the inner wall of the header tank 40 and are coupled thereto by soldering.

Figure 13:
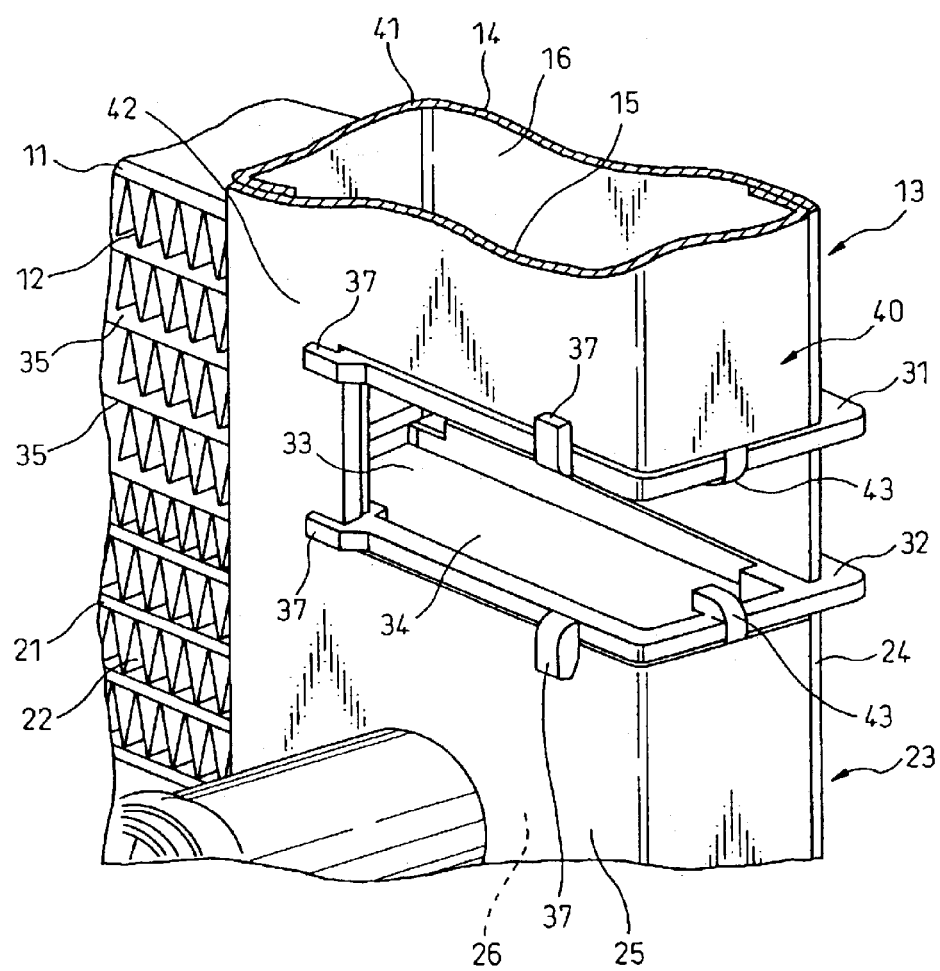
FIG. 13 is an exemplary perspective drawing of separators, assembled with a header tank, according to a tenth embodiment of the present invention.
Figure 14:
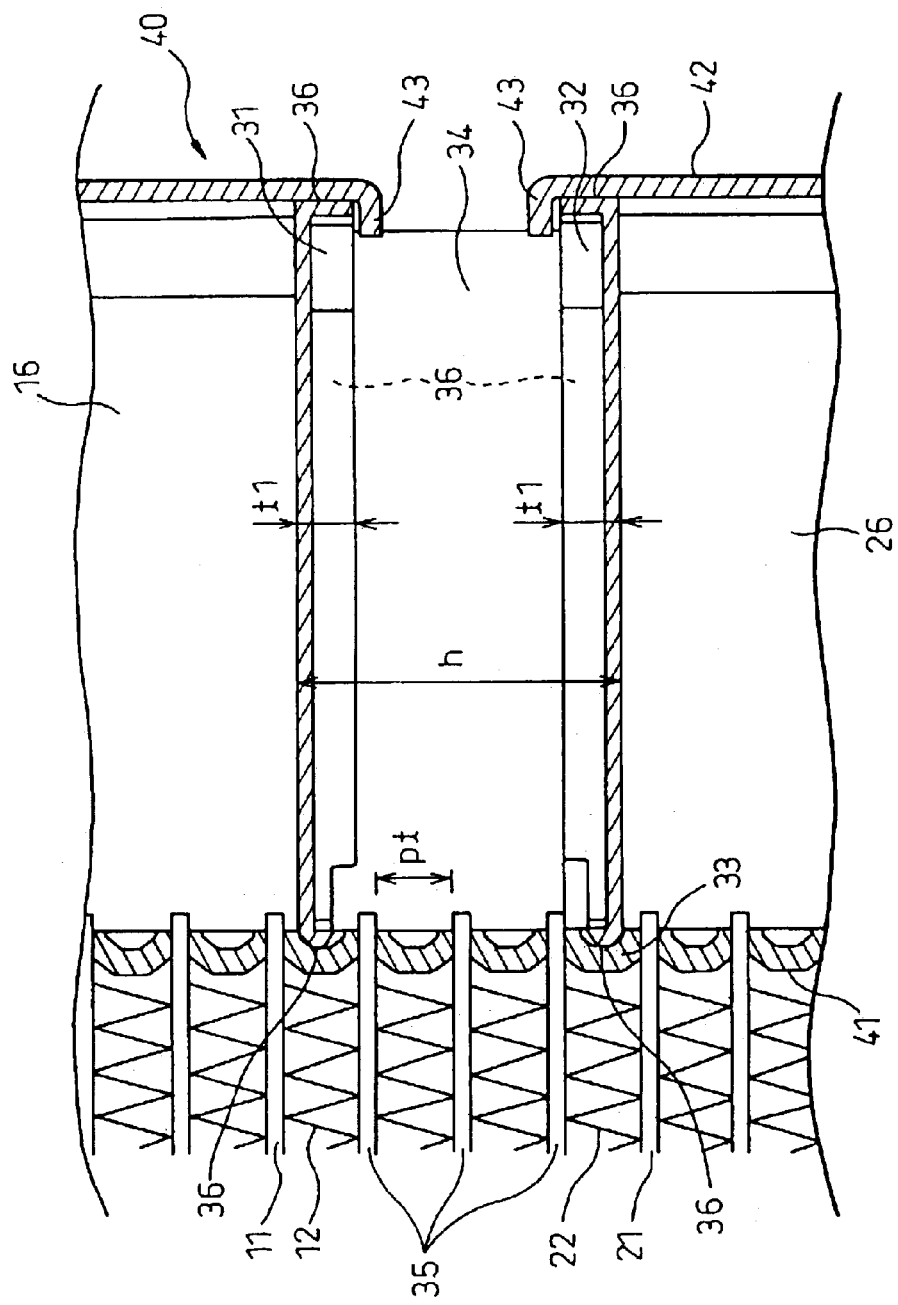
FIG. 14 is the partial sectional elevation view of FIG. 13.

On the outer circumferential portion of the both separators 31, 32, as shown in FIG. 15, calking portions 37, which come into contact with the outer wall of the header tank 40 and mechanically fix the separators 31, 32 to the header tank 40, are provided. On the other hand, on the header tank 40 calking portions 43 (refer to FIG. 13 and FIG. 14) which come into contact with the separator 31, 32 and mechanically fix the separator 31, 32 to the header tank 40 are provided.

In addition, the dimension h (refer to FIG. 14) of the portion of the aperture 33 in parallel with the longitudinal side of the header tank 40 is designed to be larger than the sum of the dimension t1 (refer to FIG. 14) of the portion of the soldered surface 36 of the first separator 31 in parallel with the longitudinal side of the header tank 40 and the dimension t2 (refer to FIG. 14) of the portion of the soldered surface 36 of the second separator 32 in parallel with the longitudinal side of the header tank 40.

In practice, the condition represented by $\{(t1+t2) \times 1.2\} <= h <= \{(t1+t2) \times 2.5\}$ is maintained. In the present embodiment, as the tubes 11, 21, 35 stick out into the header tank 40, the both separators 31, 32 are required to be arranged between the tubes 11, 21, 35. Therefore, the dimension h should have a value of the interval Pt, between the tubes (refer to FIG. 14), multiplied by an integral number and is made to be not less than two times the distance Pt and not larger than three times the distance Pt.

In the present embodiment, the value t1 is equal to the value t2 (t1=t2), and the intervals Pt between various tubes are same whichever the tubes are the first tubes 11, the second tubes 21 or the dummy tubes 35.

In addition, the tubes 11, 21, 35, the core plates 41, the tank plate 42, and the separators 31, 32, etc. are all made of an aluminum alloy. These components are assembled, as shown in FIG. 1, and then they are heated and integrally coupled by soldering in a furnace in a state in which the assembled condition is maintained by jigs such as wires.

In this case, the core plate 41 and the tank plate 42 are a clad material, which is coated with solder material on the surface corresponding to the outer surface of the header tank 40 and is coated with sacrificial and corrosive material on the surface corresponding to the inner surface of the header tank 40, and the separators 31, 32 are a clad material coated with solder material on at least the soldered surfaces 36 thereof.

Next, the functions and effects of the present embodiment will be described.

The separators 31, 32 according to the present embodiment are provided with surfaces 36 parallel with the inner wall surfaces of the header tank 40 formed by folding the outer circumferential portion of the separators 31, 32 and the surfaces 36 are made as soldered surfaces which are coupled to the header tank 40 by soldering. Therefore, the surfaces coated with solder material become the soldered surfaces, so that it is possible to obtain enough solder material on the soldered surfaces of the separators 31, 32, and it is possible to assure reliability in soldering.

Figure 19:
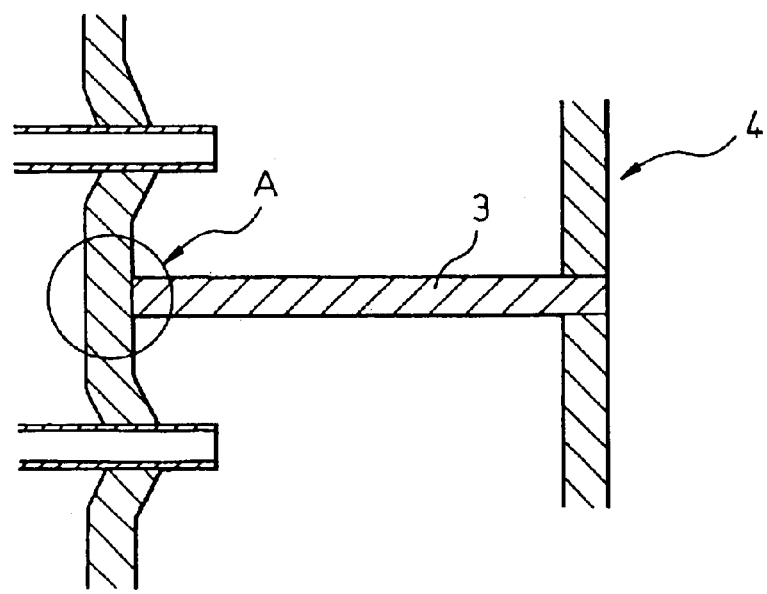
FIG. 19 is an exemplary drawing showing problems of the prior art.

On the other hand, the separators 31, 32 are provided with soldered surfaces 36 parallel with the inner wall surface of the header tank 40, so that it is not possible to assemble the separators 31, 32 to the header tank 40 by the structure of the prior art example (refer to FIG. 19) described above in which slits are provided on the header tank and the separators are inserted into the slits.

This means that, in the present embodiment after the separators 31, 32 are inserted into the header tank 40 in the transverse direction of the longitudinal direction of the header tank 40, the separators 31, 32 must be moved in a direction substantially parallel to the longitudinal direction of the header tank 40 so that the soldered surfaces 36 come into contact with the inner wall surfaces of the header tank 40 and, therefore, if the dimension h of the aperture 33 is made equal to the thickness of the separator as in the prior art example described above (refer to FIG. 19), it is not possible to move the separators 31, 32 in a direction substantially parallel to the longitudinal direction of the header tank 40 after the separators 31, 32 are inserted into the header tank 40.

On the contrary, in the present embodiment, as the dimension h of the aperture 33 is made larger than the sum of the dimension t1 of the first separator 31 and the dimension t2 of the second separator 32, it is possible to move the separators 31, 32 in a direction substantially parallel to the longitudinal direction of the header tank 40 after the separators 31, 32 are inserted into the header tank 40 and, thus, it is possible to easily assemble the separators 31, 32 to the header tank 40 (refer to FIG. 17).

Figure 18:
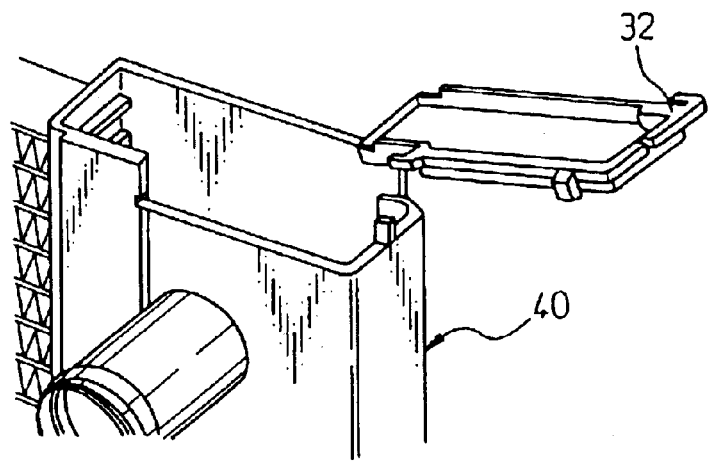
FIG. 18 is an exemplary drawing of separators according to the tenth embodiment of the present invention showing another assembling method thereof.

In the present embodiment, as the calking portions 43 are provided on the header tank 40, as shown in FIG. 18, the separators 31, 32 need be inserted into the apertures 33 in an oblique direction with respect to the longitudinal direction of the header tank 40. In the present embodiment, as the dimension h is made to be not less than 1.2 times of sum of the dimension t1 and dimension t2, it is possible for the separators 31, 32 to be easily inserted into the aperture 33 in an oblique direction with respect to the longitudinal direction of the header tank 40.

In addition, as the aperture 33 is formed by cutting off a part of the outer circumference of the header tank 40, it is possible to prevent the buckling strength of the header tank 40 from being considerably deteriorated.

(Miscellaneous Embodiments)

In the above-mentioned embodiments, although a heat exchanger according to the present invention is applied to a hybrid type vehicle, the present invention is not limited to the application and may be applied to other applications.

Figure 12A:
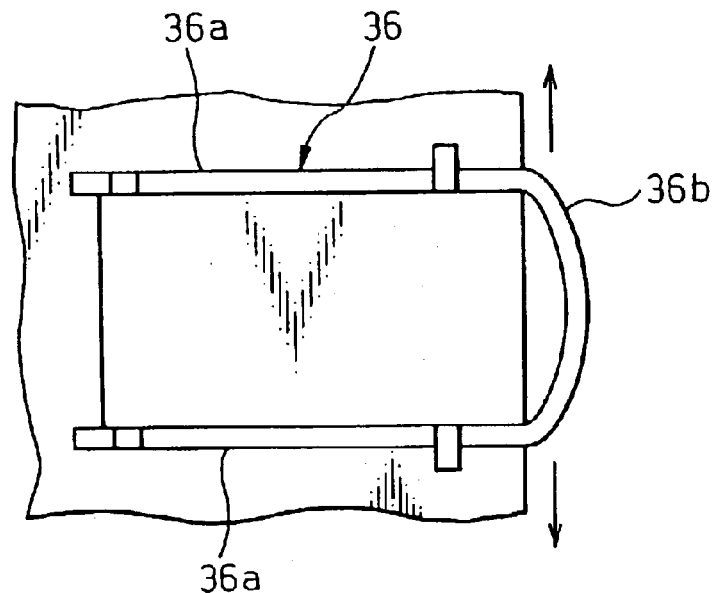
FIG. 12A is an exemplary side view of a separator according to a miscellaneous embodiment of the present invention.
Figure 12B:
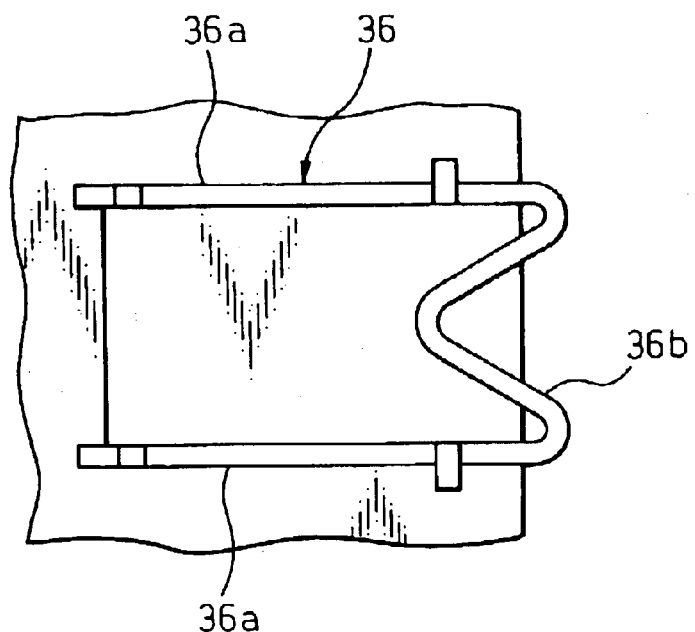
FIG. 12B is an exemplary side view of a separator according to another miscellaneous embodiment of the present invention.

Though in the second embodiment the connecting portion 36b is bent in a wave shape, the present invention is not limited to the embodiment and it may be formed, for example, in an archwise shape or an M shape, as shown in FIG. 12.

In the embodiment described above, although the soldered surfaces 36 are coupled to the inner wall of the header tank 40 by soldering, the present invention is not limited to the embodiment and the soldered surface 36 may be coupled to the outer wall of the header tank 40 by soldering.

In the embodiment described above, although the soldered surfaces 36 are formed by press work, the present invention is not limited to the embodiment and it may be formed, for example, by forging work.

In the embodiments described above, although the aperture 33 is formed by cutting off a part of the tank plate 42, the present invention is not limited to the embodiment.

Of course, there is no need to say that the heat exchanger according to the present invention and a heat exchanger for an air conditioner (for example, an outside heat exchanger installed in an atmosphere) may be integrally connected through brackets, etc.

Figure 20:
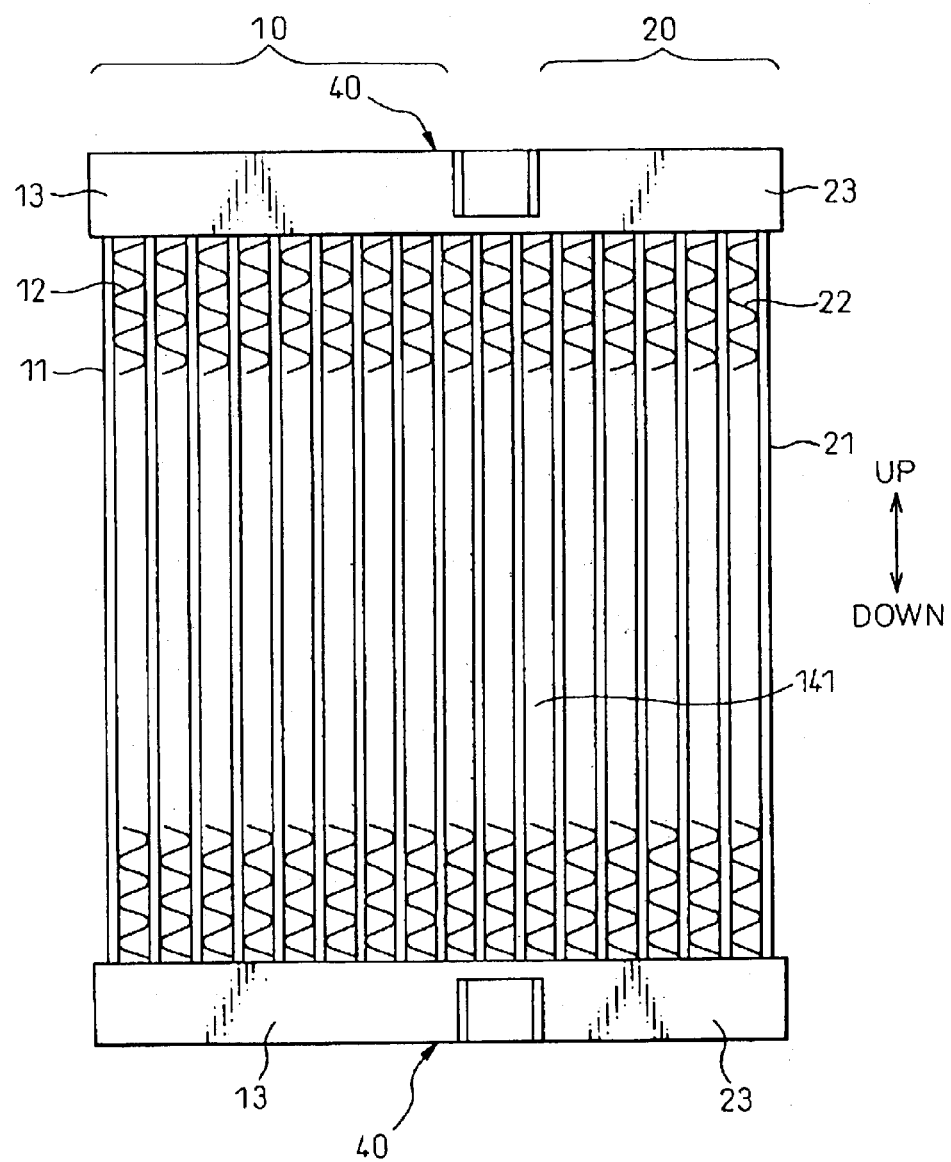
FIG. 20 is a front view of a heat exchanger according to another embodiment of the present invention in which header tanks are vertically arranged.

In the embodiments described above, although the header tanks 40 (13, 23) are horizontally arranged so that cooling water horizontally flows through the tubes 11, 21, the present invention is not limited to the embodiments and the present invention can be applied to a down-flow type heat exchanger in which the header tanks 40 are arranged vertically, i.e. on the top and the bottom, so that cooling medium, such as water, vertically flows through the tubes 11, 21, as shown in FIG. 20.

While the invention has been described by reference to specific embodiments chosen for the purposes of illustration, it should be apparent that numerous modifications could be made thereto by those skilled in the art without departing from the basic concept and scope of the invention.

What is claim is:

1. A heat exchanger comprising:
   a plurality of first tubes through which a first fluid flows;
   a plurality of second tubes which are arranged in parallel with the first tubes and through which a second fluid flows;
   header tanks which are provided on both longitudinal ends of the tubes, extend in a perpendicular direction to the extending direction of the tubes, and communicate with the tubes;
   first and second separators which separate a space in the header tank into a first space communicating with the first tubes and a second space communicating with the second tubes and, at the same time, separate the first and second spaces from each other at a desired distance; wherein
   each of the first separator and the second separator has a soldered surface formed by folding the outer circumferential portion of a plate member coated with solders and coupled to the wall surface of the header tank by soldering; wherein
   an aperture into which the two separators are inserted is provided on the header tank; and wherein
   the dimension (h) of the portion of the aperture in parallel with the longitudinal side of the header tank is larger than the sum of the dimension (t1) of the portion of the soldered surface of the first separator in parallel with the longitudinal side of the header tank and the dimension (t2) of the portion of the soldered surface of the second separator in parallel with the longitudinal side of the header tank.

2. A heat exchanger, as set forth in claim 1, wherein the dimension (h) of the portion of the aperture in parallel with the longitudinal side of the header tank is not less than 1.2 times of the sum of the dimension (t1) of the portion of the soldered surface of the first separator in parallel with the longitudinal side of the header tank and the dimension (t2) of the portion of the soldered surface of the second separator in parallel with the longitudinal side of the header tank.

3. A heat exchanger, as set forth in claim 1, wherein the dimension (h) of the portion of the aperture in parallel with the longitudinal side of the header tank is not less than 2 times of the interval dimension (Pt) between the tubes that are either the tubes.

4. A heat exchanger, as set forth in claim 1, wherein the interval between the first tubes is equal to that between the second tubes.

5. A heat exchanger, as set forth in claim 1, wherein the aperture is formed by cutting off a part of the outer circumference of the header tank.

6. A heat exchanger, as set forth in claim 1; wherein
the header tank is configured to have a core plate coupled with both tubes and a tank plate coupled to the core plate to compose a cylindrical body in combination with a core plate; and wherein
the aperture is formed by cutting off a part of the tank plate.

7. A heat exchanger, as set forth in claim 1, wherein a space in the header tank which is formed by the separators is a free space which communicates with the outside of the header tank.

* * * * *